(No Model.)

T. A. EDISON.
PHONOGRAM BLANK.

No. 430,570.        Patented June 17, 1890.

Witnesses

Inventor
Thomas A. Edison
By his Attorneys
Dyer & Seely

UNITED STATES PATENT OFFICE.

THOMAS A. EDISON, OF LLEWELLYN PARK, NEW JERSEY, ASSIGNOR TO THE EDISON PHONOGRAPH COMPANY, OF NEW JERSEY.

PHONOGRAM-BLANK.

SPECIFICATION forming part of Letters Patent No. 430,570, dated June 17, 1890.

Application filed November 26, 1887. Serial No. 256,188. (No model.)

*To all whom it may concern:*

Be it known that I, THOMAS A. EDISON, of Llewellyn Park, in the county of Essex and State of New Jersey, have invented a certain new and useful Improvement in Phonogram-Blanks, (Case No. 740,) of which the following is a specification.

The object I have in view is to produce an improved form of cylindrical phonogram-blank for my phonograph which will be durable and light, will be cheap in construction, and will retain its shape and size under varying atmospheric conditions. This I accomplish by constructing as a base for the phonogram-blank or recording-surface a cylinder of molded material, which is made plastic by heat or moisture. I prefer for this purpose plaster-of-paris, although I may use sealing-wax or a mixture of shellac and sand, sawdust, or other material, or asphalt. The plastic material—say plaster-of-paris—is molded in cylindrical form and allowed to set, when the wax-like phonogram-blank surface is placed upon it and the surface is turned down true in any suitable manner. The plaster-of-paris cylinder is given, preferably, a tapering bore, so as to be held by friction upon the tapering phonogram-cylinder of my phonograph. The phonogram-blanks will be made the full length of the phonogram-cylinder, and these full-length phonogram-blanks will also be divided into sections, so that the smaller sizes can be used for letters or memoranda of short length.

Figure 1:
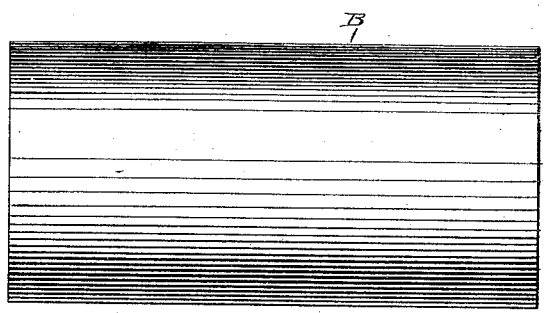
Figure 2:
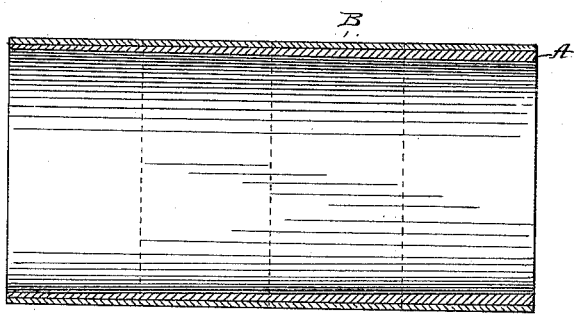

In the accompanying drawings, forming a part hereof, Figure 1 is an elevation of a phonogram-blank. Fig. 2 is a sectional view of the same, showing by dotted lines the divisions which will be made for producing sectional phonogram-blanks; and Fig. 3, an end view showing a modified form of the tapering bore.

Figure 3:
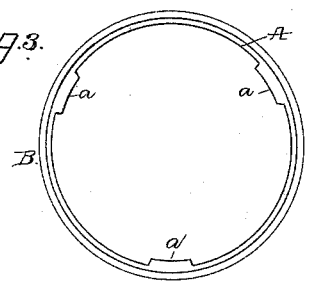

A is the cylindrical base, made of molded plastic material—such as plaster-of-paris—or a material which is heated to be made plastic such as asphalt or sealing-wax. This cylinder has a tapering bore, as shown in Fig. 2, and a true cylindrical outer surface. The tapering bore may be formed by ribs $a$, as shown in Fig. 3. Upon this cylinder is placed a coating of wax or wax-like substance B, which forms the recording-surface.

I do not claim herein a phonogram-blank having a wax or wax-like recording-surface, or such a surface and a backing of tougher material, since these matters are covered by my application for patent, (Case No. 734,) Serial No. 252,964. Neither do I claim a cylindrical phonogram-blank having a tapering bore, since this will be made the subject of a separate application for patent.

What I claim is—

1. A phonogram-blank composed of a cylindrical base of molded material, having a tapering bore, and a recording-surface of softer material, substantially as set forth.

2. A phonogram-blank composed of a base of plaster-of-paris and a recording-surface of softer material, substantially as set forth.

This specification signed and witnessed this 22d day of November, 1887.

THOS. A. EDISON.

Witnesses:
 WILLIAM PELZER,
 E. C. ROWLAND.